United States Patent
Nakamura (10) Patent No.: US 11,913,550 B2
(45) Date of Patent: Feb. 27, 2024

(54) CONTINUOUSLY VARIABLE TRANSMISSION, UTILITY VEHICLE AND CVT CASE

(71) Applicant: KAWASAKI MOTORS, LTD., Akashi (JP)

(72) Inventor: Yuki Nakamura, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 7 days.

(21) Appl. No.: 17/660,063

(22) Filed: Apr. 21, 2022

(65) Prior Publication Data

US 2023/0341029 A1 Oct. 26, 2023

(51) Int. Cl.
| F16H 9/14 | (2006.01) |
| B60K 17/08 | (2006.01) |
| F16H 57/035 | (2012.01) |
| F16H 57/04 | (2010.01) |

(52) U.S. Cl.
CPC .............. F16H 9/14 (2013.01); B60K 17/08 (2013.01); F16H 57/035 (2013.01); F16H 57/0416 (2013.01); F16H 57/0489 (2013.01)

(58) Field of Classification Search
CPC ...... F16H 9/14; F16H 57/035; F16H 57/0416; F16H 57/0489; B60K 17/08
USPC ........................................................... 474/8
See application file for complete search history.

(56) References Cited

U.S. PATENT DOCUMENTS

| 6,338,688 B1 * | 1/2002 | Minami ................ F16H 57/035 |
| | | 474/146 |
| 2004/0224806 A1 | 11/2004 | Chonan |
| 2008/0284124 A1 * | 11/2008 | Brady ...................... B62K 5/01 |
| | | 280/124.135 |
| 2015/0024890 A1 * | 1/2015 | Eberhardt ............. F16H 57/031 |
| | | 474/144 |
| 2015/0377341 A1 * | 12/2015 | Renner ............... F16H 57/0416 |
| | | 474/93 |
| 2016/0061314 A1 * | 3/2016 | Kuhl ................... F16H 57/0416 |
| | | 474/8 |
| 2018/0180163 A1 * | 6/2018 | Schleif ............... F16H 57/0416 |
| 2018/0245682 A1 * | 8/2018 | Davis .................... F16H 57/035 |

FOREIGN PATENT DOCUMENTS

JP 2004316857 A 11/2004

* cited by examiner

Primary Examiner — Gene O Crawford
Assistant Examiner — Emily R Kincaid
(74) Attorney, Agent, or Firm — Alleman Hall & Tuttle LLP (57) ABSTRACT

A continuously variable transmission includes: a CVT mechanism including a driving pulley, a driven pulley, an annular belt wound around the driving pulley and the driven pulley, and a centrifugal fan blade disposed at the driving pulley; and a CVT case that defines an internal space accommodating the CVT mechanism. An inner surface of the CVT case includes: a peripheral surface portion that covers the CVT mechanism from an outer side in a radial direction orthogonal to an axial direction of the driving pulley; and a guide surface portion that projects toward an inner side in the radial direction from the peripheral surface portion.

11 Claims, 5 Drawing Sheets

CONTINUOUSLY VARIABLE TRANSMISSION, UTILITY VEHICLE AND CVT CASE

BACKGROUND OF THE INVENTION

Field of the Invention

The present disclosure relates to a continuously variable transmission, a utility vehicle, and a CVT case.

Description of the Related Art

JP2004-316857A discloses an all terrain vehicle including a continuously variable transmission. The continuously variable transmission includes a CVT mechanism and a CVT case that defines an internal space accommodating the CVT mechanism. An intake duct that guides outside air as cooling air to the internal space of the CVT case is connected to the CVT case.

SUMMARY OF THE INVENTION

A continuously variable transmission according to one aspect of the present disclosure includes: a CVT mechanism including a driving pulley, a driven pulley, an annular belt wound around the driving pulley and the driven pulley, and a centrifugal fan blade disposed at the driving pulley; and a CVT case that defines an internal space accommodating the CVT mechanism. An inner surface of the CVT case includes a peripheral surface portion that covers the CVT mechanism from an outer side in a radial direction orthogonal to an axial direction of the driving pulley and a guide surface portion that projects toward an inner side in the radial direction from the peripheral surface portion.

A utility vehicle according to one aspect of the present disclosure includes: a prime mover; and a continuously variable transmission connected to the prime mover. The continuously variable transmission includes: a CVT mechanism including a driving pulley, a driven pulley, an annular belt wound around the driving pulley and the driven pulley, and a centrifugal fan blade disposed at the driving pulley; and a CVT case that defines an internal space accommodating the CVT mechanism. An inner surface of the CVT case includes: a peripheral surface portion that covers the CVT mechanism from an outer side in a radial direction orthogonal to an axial direction of the driving pulley; and a guide surface portion that projects toward an inner side in the radial direction from the peripheral surface portion.

A CVT case according to one aspect of the present disclosure is a CVT case that defines an internal space accommodating a CVT mechanism including a driving pulley, a driven pulley, an annular belt wound around the driving pulley and the driven pulley, and a centrifugal fan blade disposed at the driving pulley. The CVT case includes an inner surface that defines the internal space. The inner surface includes: a peripheral surface portion that covers the CVT mechanism from an outer side in a radial direction orthogonal to an axial direction of the driving pulley; and a guide surface portion that projects toward an inner side in the radial direction from the peripheral surface portion.

DESCRIPTION OF THE PREFERRED EMBODIMENTS

Hereinafter, an embodiment will be described with reference to the drawings.

Figure 1:
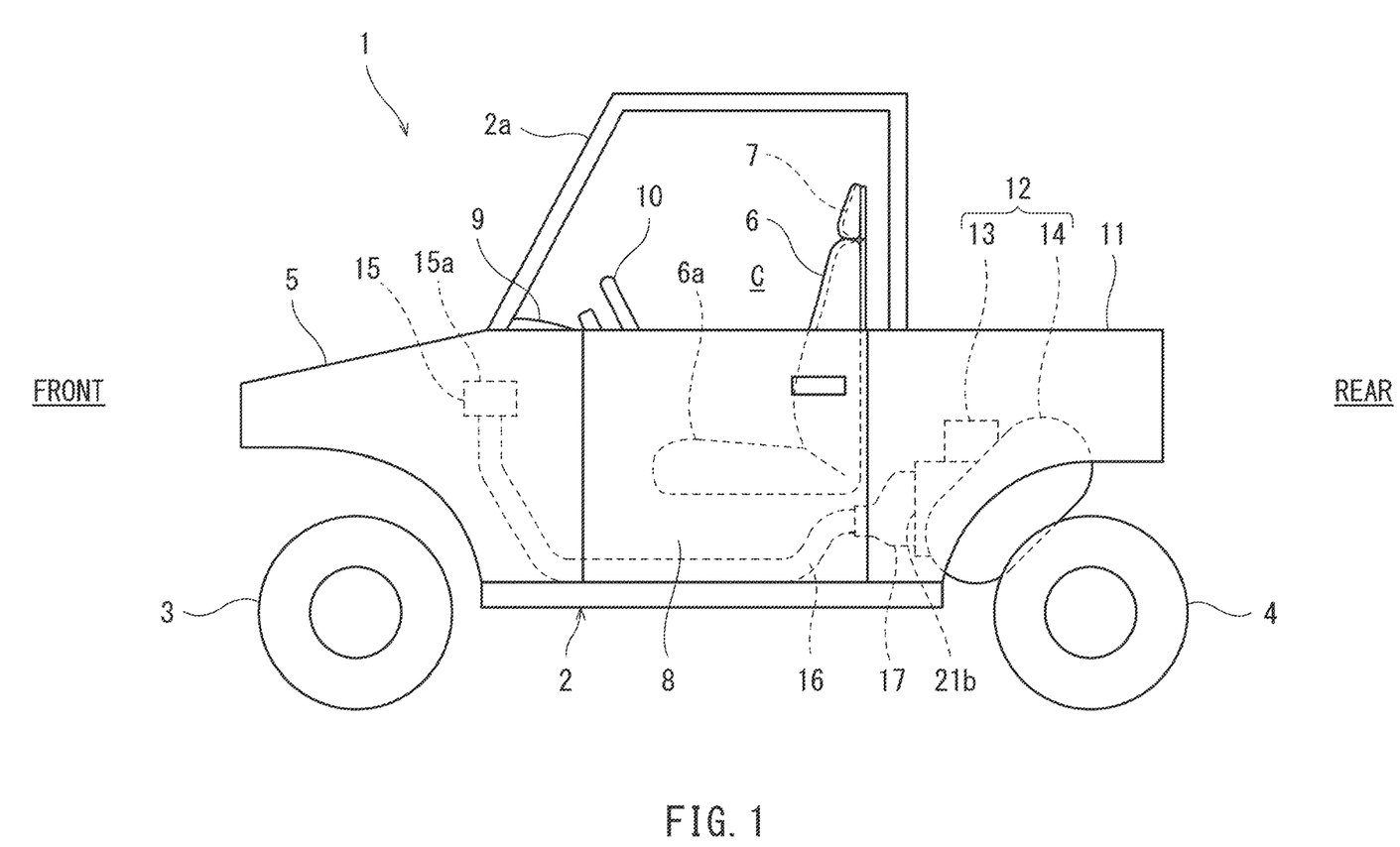
FIG. 1 is a schematic left side view of a utility vehicle according to an embodiment.

FIG. 1 is a schematic left side view of a utility vehicle 1 according to the embodiment. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. Tires of the front wheels 3 and the rear wheels 4 are balloon tires for uneven ground traveling. A space between the left and right front wheels 3 is covered with a hood 5 from above. A driver's seat 6 and a passenger seat 7 are arranged side by side behind the hood 5 and are supported by the vehicle body frame 2.

The vehicle body frame 2 is a pipe frame including pipes connected to each other. The vehicle body frame 2 includes, for example, a cabin frame 2a surrounding an occupant space C where the driver's seat 6 and the passenger seat 7 are arranged. Entrances that are opened or closed by side doors 8 are open at both sides of the occupant space C. The occupant space C surrounded by the cabin frame 2a is exposed to an outside. A dash panel 9 is arranged in front of the driver's seat 6 and the passenger seat 7. A steering wheel 10 is located at the dash panel 9 so as to project toward the driver's seat 6.

A cargo bed 11 defining a hollow loading space that is open to an outside is arranged behind the cabin frame 2a. A driving source assembly 12 is mounted behind the driver's seat 6 and under the cargo bed 11. The driving source assembly 12 includes a prime mover 13 and a continuously variable transmission 14. The prime mover 13 may be an internal combustion engine, an electric motor, or a combination thereof. The continuously variable transmission 14 is cooled in such a manner that outside air as cooling air flows inside the continuously variable transmission 14. In a side view of the vehicle 1, the continuously variable transmission 14 is arranged in front of and above the rear wheels 4. In the side view of the vehicle 1, the continuously variable transmission 14 is arranged diagonally such that a longitudinal direction of the continuously variable transmission 14 is directed rearward and upward.

An air cleaner 15 including an air take-in port 15a through which the outside air is taken in the air cleaner 15 is arranged in front of the steering wheel 10 and under the hood 5. The air cleaner 15 is arranged higher than a seat surface 6a of the driver's seat 6. An intake duct 17 that is a fluid duct is attached to the continuously variable transmission 14. The intake duct 17 is arranged lower than the seat surface 6a of the driver's seat 6. An intake pipe 16 that connects the air cleaner 15 to the intake duct 17 extends in a front-rear direction while passing through a position lower than the seat surface 6a of the driver's seat 6.

Figure 2:
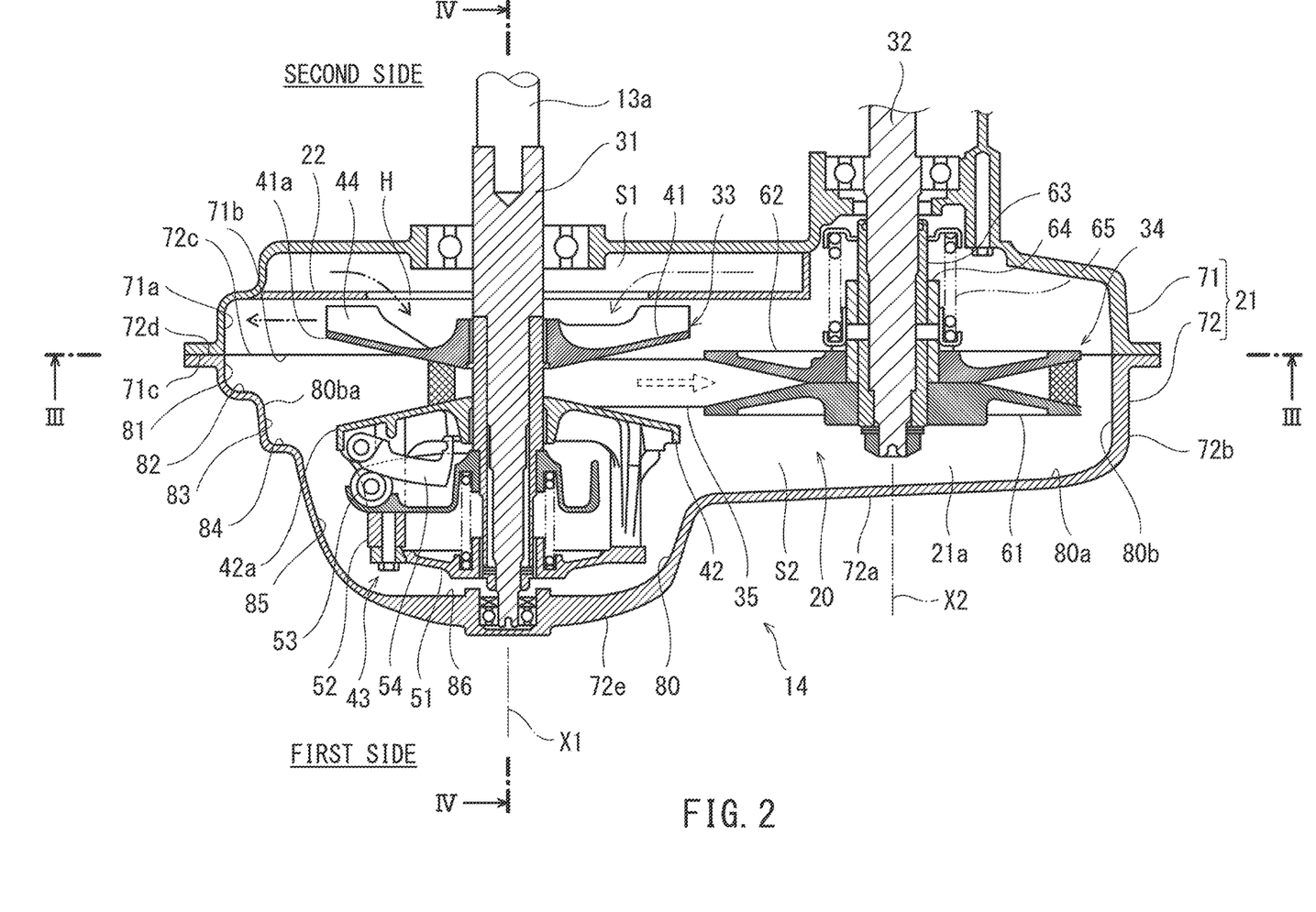
FIG. 2 is a sectional view of a continuously variable transmission of FIG. 1.

FIG. 2 is a sectional view of the continuously variable transmission 14 of FIG. 1. As shown in FIG. 2, the continuously variable transmission 14 includes a CVT mechanism 20 and a CVT case 21 accommodating the CVT mechanism 20. The CVT mechanism 20 includes an input shaft 31, an output shaft 32, a driving pulley 33, a driven pulley 34, and a belt 35. An axis X1 of the input shaft 31 and an axis of a driving shaft 13a are located on the same straight line. To be specific, the input shaft 31 is connected to the driving shaft 13a (for example, a crank shaft) of the prime mover 13 on the same axis and receives rotational power from the prime mover 13. The output shaft 32 outputs the rotational power to driving wheels (the front wheels 3 and/or the rear wheels 4). Hereinafter, a direction in which the axis X1 extends is referred to as an axial direction X1.

The driving pulley 33 is disposed at the input shaft 31 so as to rotate integrally with the input shaft 31. The driven pulley 34 is disposed at the output shaft 32 so as to rotate integrally with the output shaft 32. The belt 35 having a V shape is wound around the driving pulley 33 and the driven pulley 34. In the present embodiment, the driving shaft 13a and the input shaft 31 are directly coupled to each other, but a centrifugal clutch may be interposed between the driving shaft 13a and the input shaft 31.

The driving pulley 33 includes: a fixed sheave 41 fixed to the input shaft 31; a movable sheave 42 fitted to the input shaft 31 so as to be movable in the axial direction X1; and a sheave thruster 43 (for example, a flyweight type). The belt 35 is sandwiched between pressure surfaces of the fixed sheave 41 and the movable sheave 42. When the movable sheave 42 moves along the input shaft 31, and this changes an interval between the fixed sheave 41 and the movable sheave 42, a position, where the belt 35 is sandwiched, at the driving pulley 33 in a radial direction (direction orthogonal to the axis X1) of the driving pulley 33 changes (i.e., an effective diameter of the driving pulley 33 changes).

The sheave thruster 43 mechanically moves the movable sheave 42 relative to the fixed sheave 41 in accordance with a rotational frequency of the driving pulley 33 such that the movable sheave 42 approaches or separates from the fixed sheave 41 in the axial direction X1. The sheave thruster 43 includes a receiving plate 51, a coupling arm 52, a pressure receiving roller 53, and a flyweight 54. The receiving plate 51 is arranged at a back surface side of the movable sheave 42 and away from the movable sheave 42 in the axial direction X1. The pressure receiving roller 53 is supported by the receiving plate 51 through the coupling arm 52. The flyweight 54 is arranged at the back surface side of the movable sheave 42 and is supported by the movable sheave 42 while being in contact with the pressure receiving roller 53.

The flyweight 54 turns in a direction away from the movable sheave 42 by rotational centrifugal force of the driving pulley 33 to press the pressure receiving roller 53 in the axial direction X1 and moves the movable sheave 42 in a direction toward the fixed sheave 41 by reaction force from the pressure receiving roller 53. To be specific, by the rotational centrifugal force of the driving pulley 33, the sheave thruster 43 generates thrust that narrows the interval between the fixed sheave 41 and the movable sheave 42. A centrifugal fan blade 44 that generates swirling flow is disposed on a back surface of the fixed sheave 41.

The driven pulley 34 includes: a fixed sheave 61 fixed to the output shaft 32; and a movable sheave 62 fitted to the output shaft 32 so as to be movable in a direction (may be referred to as an axial direction X2) in which an axis X2 of the output shaft 32 extends. A cam cylinder 63 including spiral cam grooves is fixed to an outer peripheral surface of the output shaft 32. The cam cylinder 63 and the fixed sheave 61 rotate together with the output shaft 32. A sleeve 64 is integrally coupled to an inner peripheral end of the movable sheave 62. The sleeve 64 is fitted to an outer peripheral surface of the cam cylinder 63 so as to be movable in the axial direction X2 and supports a roller that is movable along the cam grooves of the cam cylinder 63.

The sleeve 64 is biased toward the fixed sheave 61 by a pressure regulating spring 65, and the movable sheave 62 is pressed toward the fixed sheave 61. When the movable sheave 62 receives rotational force by tensile force of the belt 35, thrust that moves the movable sheave 62 toward the fixed sheave 61 is generated by a cam action between the cam cylinder 63 and the roller.

When the rotational frequency of the input shaft 31 is low, the effective diameter of the driving pulley 33 is small, and the effective diameter of the driven pulley 34 is large (i.e., a reduction ratio is high). When the rotational frequency of the input shaft 31 increases, the movable sheave 42 approaches the fixed sheave 41 by the thrust of the sheave thruster 43 generated by the increase in centrifugal force, and this increases the effective diameter of the driving pulley 33. At the driven pulley 34, the tensile force of the belt 35 increases, and this increases force acting toward a radially inner side of the belt 35. Then, the movable sheave 62 moves in a direction away from the fixed sheave 61 against spring force of the pressure regulating spring 65 and cam thrust of the cam cylinder 63, and this decreases the effective diameter of the driven pulley 34 (i.e., the reduction ratio becomes low). FIG. 2 shows that the movable sheave 42 is located farthest away from the fixed sheave 41 at the driving pulley 33.

The CVT case 21 defines an internal space 21a in which the CVT mechanism 20 is arranged. The CVT case 21 includes a case main body 71 and a cover 72. The case main body 71 may be made of metal. The cover 72 may be made of metal or synthetic resin. The case main body 71 has a recessed section. The case main body 71 includes an inner peripheral surface 71a and an opening 71b. The inner peripheral surface 71a is opposed to the centrifugal fan blade 44 from an outer side in a radial direction orthogonal to the axial direction X1. The opening 71b is open toward a first side of the driving pulley 33 in the axial direction X1 and is defined by an end edge of the inner peripheral surface 71a.

The cover 72 is attached to the case main body 71 by fasteners to close the opening 71b. The cover 72 has a recessed section. The cover 72 includes a bottom wall portion 72a, a peripheral wall portion 72b, and an opening 72c. The bottom wall portion 72a is opposed to the CVT mechanism 20 from the first side in the axial direction X1. The peripheral wall portion 72b projects from the bottom wall portion 72a toward the case main body 71. The opening 72c is open toward a second side in the axial direction X1 and is defined by an end edge of the peripheral wall portion 72b. The case main body 71 and the cover 72 include respective contact surfaces 71c and 72d that are in contact with each other.

The bottom wall portion 72a includes a recess 72e that is located in a region opposed to the driving pulley 33 in the axial direction X1 and is recessed toward the first side in the axial direction X1. The sheave thruster 43 is accommodated in the recess 72e. The case main body 71 includes an inflow opening 21b (see FIG. 1) and an outflow opening 21c (see FIG. 3) which communicate with the internal space 21a. The cooling air from an outside flows through the inflow opening 21b (see FIG. 1) into the internal space 21a, and the cooling air in the internal space 21a is discharged through the outflow opening 21c (see FIG. 3) to an outside.

A partition 22 is disposed in the CVT case 21. The partition 22 extends in the radial direction of the driving pulley 33 and divides the internal space 21a into a first chamber S1 and a second chamber S2. The first chamber S1 communicates with the inflow opening 21b (see FIG. 1). The second chamber S2 communicates with the outflow opening 21c (see FIG. 3). The CVT mechanism 20 is arranged in the second chamber S2. The partition 22 includes a portion opposed to the centrifugal fan blade 44 in the axial direction X1. The partition 22 includes a communication opening H that is opposed to a radially inner portion of the centrifugal fan blade 44 and makes the first chamber S1 communicate with the second chamber S2. The input shaft 31 passes through the communication opening H.

Figure 3:
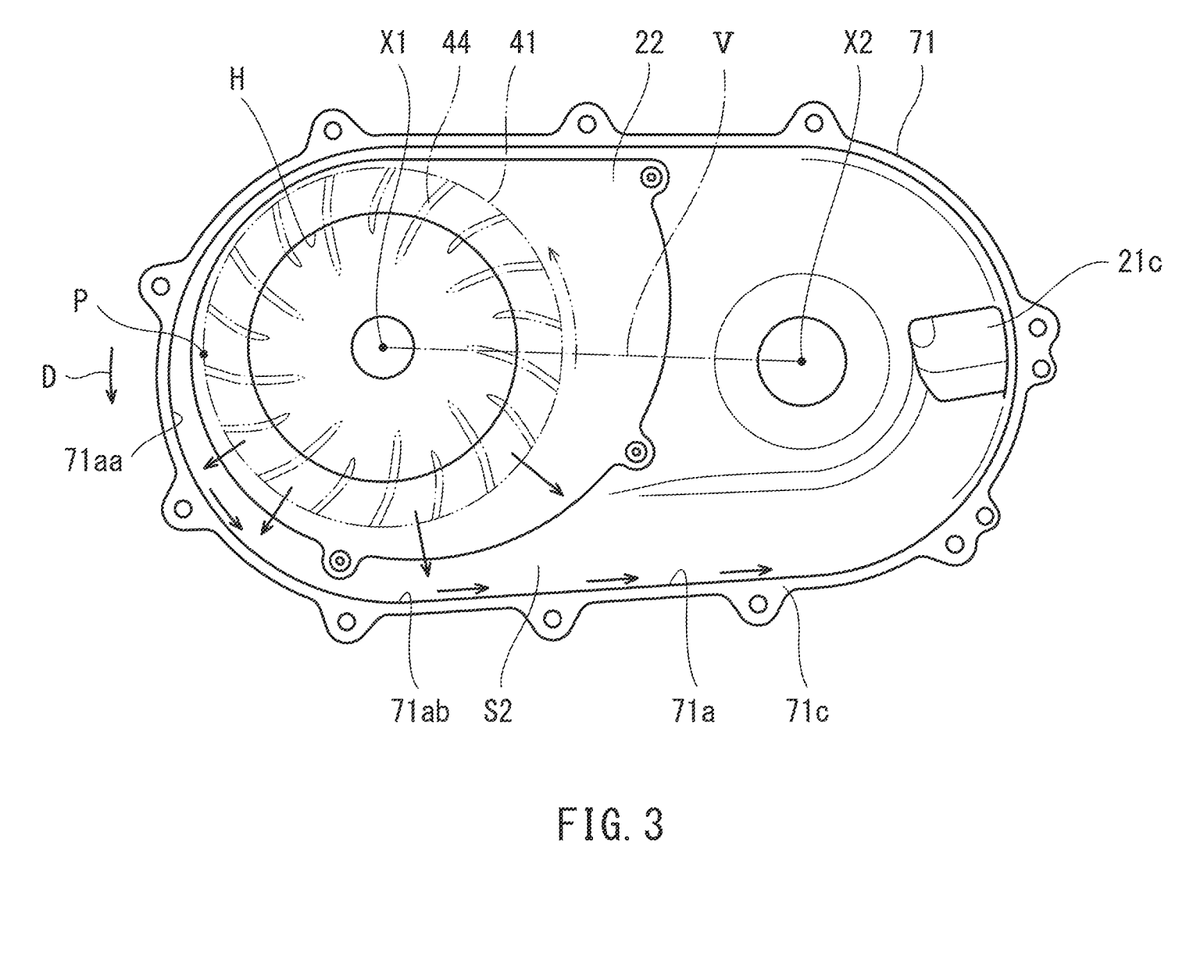
FIG. 3 is a sectional view taken along line of FIG. 2.

FIG. 3 is a sectional view taken along line of FIG. 2. As shown in FIG. 3, the inner peripheral surface 71a of the case main body 71 includes an arc-shaped first region 71aa that is opposed to the internal space 21a from an opposite side of the axis X2 in a direction in which a virtual line V connecting the axis X1 and the axis X2 extends when viewed from the axial direction X1. The inner peripheral surface 71a of the case main body 71 includes a second region 71ab that is located in front of a point P, located farthest from the axis X2, of a radially outer end of the fixed sheave 41 in a rotational direction D of the fixed sheave 41 and extends along the virtual line V when viewed from the axial direction X1. When viewed from the axial direction X1, the second region 71ab extends linearly along the virtual line V.

When the centrifugal fan blade 44 rotates by the rotation of the driving pulley 33 (see FIG. 2), the cooling air around the communication opening H is supplied outward in the radial direction. The supplied cooling air flows toward the outflow opening 21c along the first region 71aa and the second region 71ab of the inner peripheral surface 71a of the case main body 71. Then, the cooling air which has cooled the belt 35 (see FIG. 2) and the like flows out from the outflow opening 21c. When the centrifugal fan blade 44 supplies the cooling air around the communication opening H outward in the radial direction, negative pressure is generated around the communication opening H in the second chamber S2, and the cooling air in the first chamber S1 (see FIG. 2) is sucked into the second chamber S2 through the communication opening H.

Figure 4:
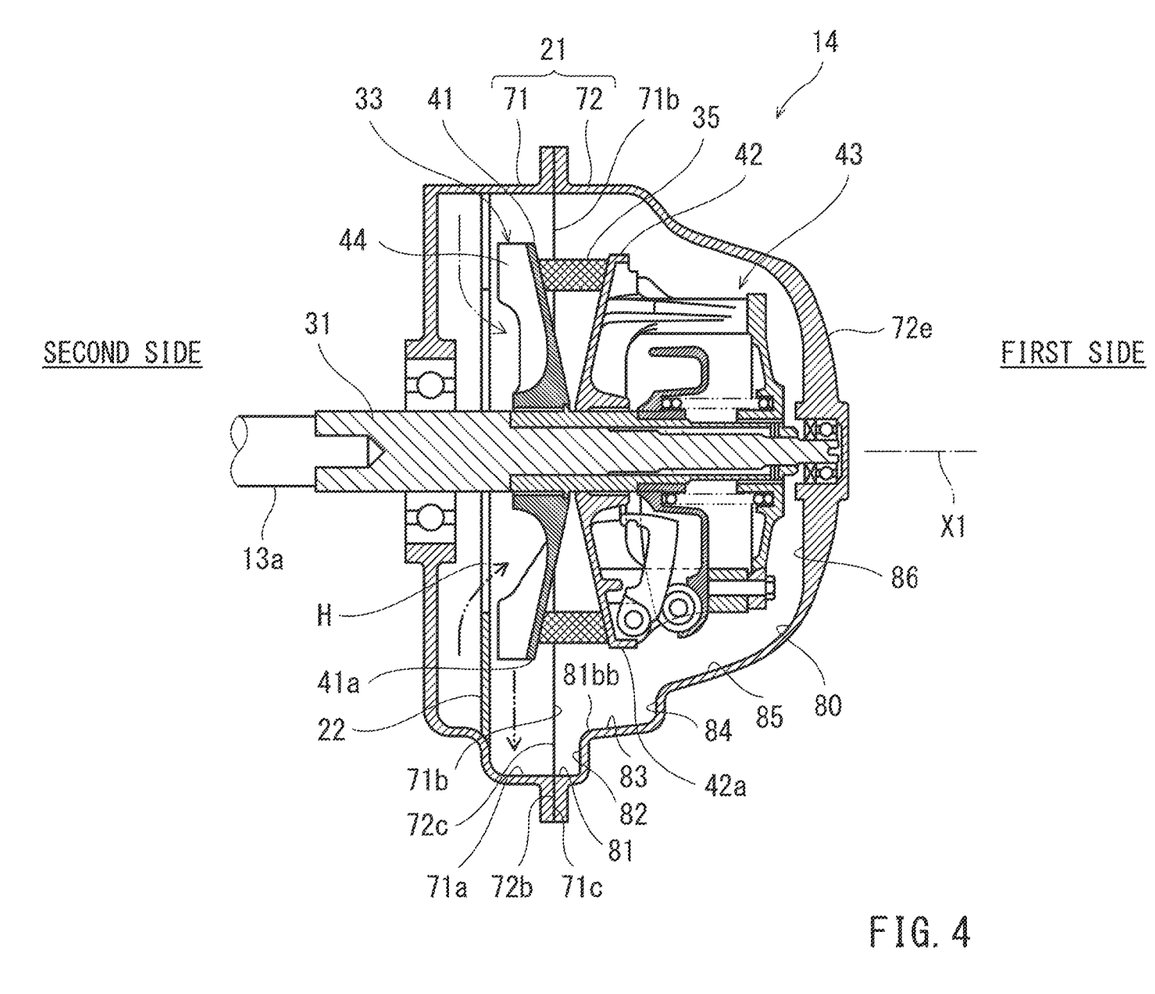
FIG. 4 is a sectional view taken along line IV-IV of FIG. 2.
Figure 5:
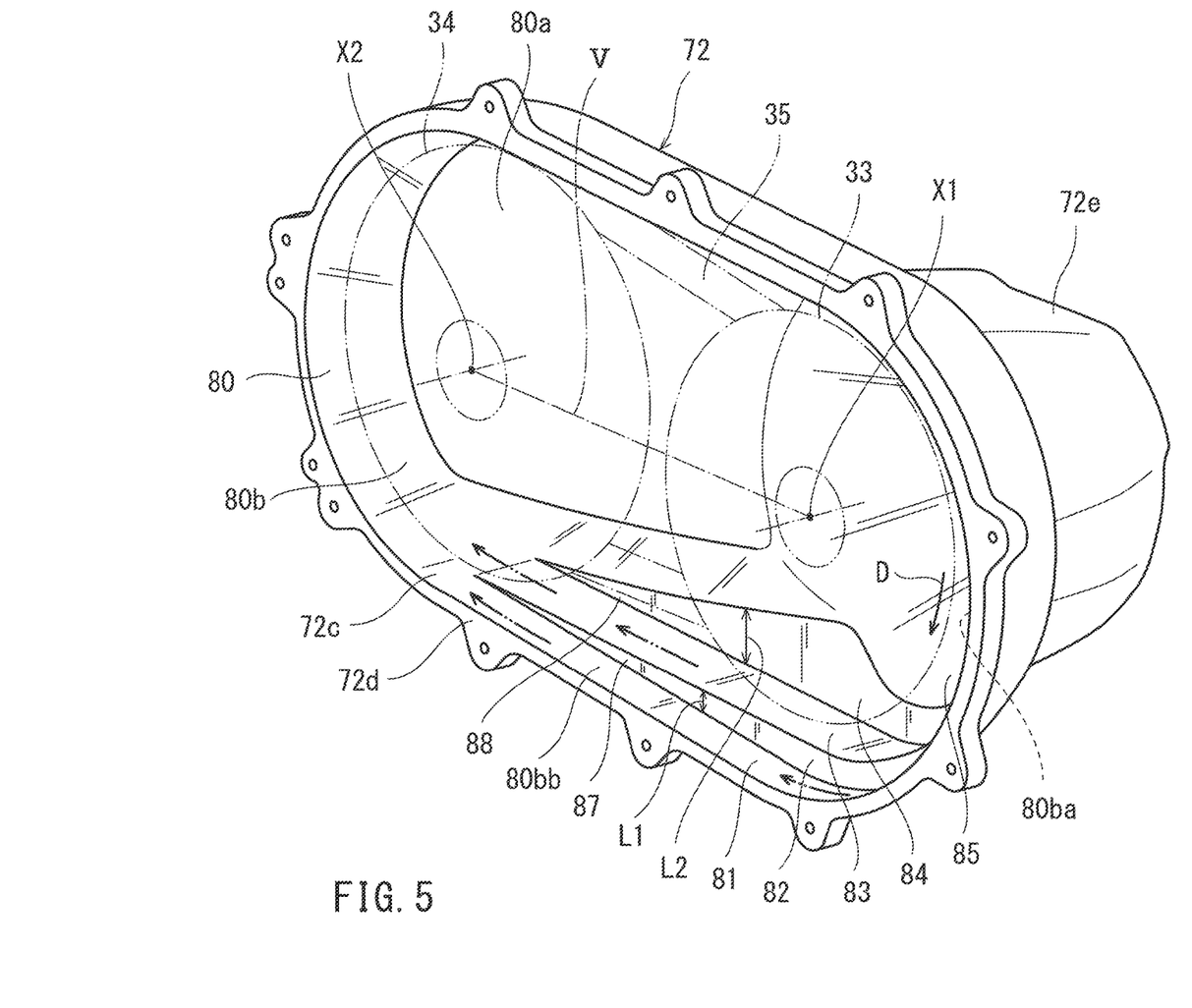
FIG. 5 is a perspective view of a cover of a CVT case of FIG. 2.

FIG. 4 is a sectional view taken along line IV-IV of FIG. 2. FIG. 5 is a perspective view of the cover of the CVT case of FIG. 2. FIG. 4 shows that the movable sheave 42 is located closest to the fixed sheave 41 in the driving pulley 33. As shown in FIG. 4, the contact surface 71c of the case main body 71 and the contact surface 72d of the cover 72 are arranged at the second side in the axial direction X1 beyond a portion of a radially outer end 42a of the movable sheave 42 located closest to the fixed sheave 41, the portion being located at the most second side in the axial direction X1.

As shown in FIGS. 2 and 5, an inner surface 80 of the cover 72 includes a bottom surface 80a and an inner peripheral surface 80b. The bottom surface 80a is opposed to the CVT mechanism 20 from the first side in the axial direction X1. The inner peripheral surface 80b is opposed to the CVT mechanism 20 from the outer side in the radial direction orthogonal to the axial direction X1. As shown in FIGS. 2 and 5, the inner peripheral surface 80b of the cover 72 includes a first region 80ba located adjacent to the first region 71aa (see FIG. 3) of the inner peripheral surface 71a of the case main body 71 in the axial direction X1. To be specific, the first region 80ba of the inner peripheral surface 80b of the cover 72 is an arc-shaped region that is opposed to the internal space 21a from the opposite side of the axis X2 in the direction in which the virtual line V extends when viewed from the axial direction X1.

As shown in FIGS. 4 and 5, the inner peripheral surface 80b of the cover 72 includes a second region 80bb located adjacent to the second region 71ab (see FIG. 3) of the inner peripheral surface 71a of the case main body 71 in the axial direction X1. The second region 80bb of the inner peripheral surface 80b of the cover 72 is a region that is located in front of the point P (see FIG. 3) in the rotational direction D of the fixed sheave 41 and extends along the virtual line V when viewed from the axial direction X1. The second region 80bb extends linearly along the virtual line V when viewed from the axial direction X1. The inner peripheral surface 80b of the cover 72 has a stair shape at the first region 80ba and a stair shape at the second region 80bb.

As shown in FIGS. 2 and 4, the inner peripheral surface 80b of the cover 72 has such a stair shape that in the first region 80ba, the inner peripheral surface 80b approaches the axis X1 as the inner peripheral surface 80b extends from the opening 72c toward a bottom surface portion 86. Specifically, the inner peripheral surface 80b of the cover 72 includes a first peripheral surface portion 81, a first guide surface portion 82, a second peripheral surface portion 83, a second guide surface portion 84, and a third peripheral surface portion 85. The inner surface 80 of the cover 72 includes the bottom surface portion 86 that is opposed to the driving pulley 33 in the axial direction X1. The first peripheral surface portion 81, the first guide surface portion 82, the second peripheral surface portion 83, the second guide surface portion 84, and the third peripheral surface portion 85 are lined up in this order from the opening 72c toward the bottom surface portion 86.

In the cover 72, the first peripheral surface portion 81 is arranged adjacent to the contact surface 72d in the axial direction X1. With the cover 72 fixed to the case main body 71, the first peripheral surface portion 81 is arranged adjacent to the inner peripheral surface 71a of the case main body 71 in the axial direction X1. The first peripheral surface portion 81 is arranged on an extension of the inner peripheral surface 71a of the case main body 71 in the axial direction X1. The first peripheral surface portion 81 faces an inner side in the radial direction orthogonal to the axial direction X1 so as to cover the CVT mechanism 20 from the outer side in the radial direction.

The first guide surface portion 82 projects toward the inner side in the radial direction from an end of the first peripheral surface portion 81 which end is located at the first side in the axial direction X1. The first guide surface portion 82 faces the second side in the axial direction X1. As shown in FIG. 2, the first guide surface portion 82 is arranged at the first side in the axial direction X1 beyond a portion of a radially outer end 41a of the fixed sheave 41, the portion being located at the most first side in the axial direction X1. The first guide surface portion 82 is arranged at the second side in the axial direction X1 beyond a portion of the radially outer end 42a of the movable sheave 42 located farthest away from the fixed sheave 41, the portion being located at the most second side in the axial direction X1. More specifically, as shown in FIG. 4, the first guide surface portion 82 is arranged at the second side in the axial direction X1 beyond a portion of the radially outer end 42a of the movable sheave 42 located closest to the fixed sheave 41, the portion being located at the most second side in the axial direction X1.

The second peripheral surface portion 83 extends from a radially inner end of the first guide surface portion 82 toward the first side in the axial direction X1. The second peripheral surface portion 83 faces the inner side in the radial direction so as to cover the CVT mechanism 20 from the outer side in the radial direction. The second peripheral surface portion 83 is closer to the axis X1 than the first peripheral surface portion 81 is.

The second guide surface portion 84 projects toward the inner side in the radial direction from an end of the second peripheral surface portion 83 which end is located at the first side in the axial direction X1. The second guide surface portion 84 faces the second side in the axial direction X1. As shown in FIG. 4, the second guide surface portion 84 is arranged at the first side in the axial direction X1 beyond a portion of the radially outer end 42a of the movable sheave 42 located closest to the fixed sheave 41, the portion being located at the most first side in the axial direction X1.

The third peripheral surface portion 85 extends from a radially inner end of the second guide surface portion 84 toward the first side in the axial direction X1. The third peripheral surface portion 85 faces the inner side in the radial direction so as to cover the CVT mechanism 20 from the outer side in the radial direction. The third peripheral surface portion 85 is closer to the axis X1 than the second peripheral surface portion 83 is. The third peripheral surface portion 85 is connected to the bottom surface portion 86 at the first side in the axial direction X1.

As shown in FIG. 5, the inner peripheral surface 80b of the cover 72 includes a first extended guide surface portion 87 and a second extended guide surface portion 88 in the second region 80bb. The first extended guide surface portion 87 is continuous with the first guide surface portion 82 in a circumferential direction of the inner peripheral surface 80b. When viewed from the axial direction X1, the first extended guide surface portion 87 projects toward the virtual line V connecting the axis X1 of the driving pulley 33 and the axis X2 of the driven pulley 34. The second extended guide surface portion 88 is continuous with the second guide surface portion 84 in the circumferential direction of the inner peripheral surface 80b of the cover 72. The second extended guide surface portion 88 projects toward the virtual line V when viewed from the axial direction X1.

A projection amount L1 of the first extended guide surface portion 87 decreases as the first extended guide surface portion 87 extends from the driving pulley 33 toward the driven pulley 34. Similarly, a projection amount L2 of the second extended guide surface portion 88 decreases as the second extended guide surface portion 88 extends from the driving pulley 33 toward the driven pulley 34. At the same position of the inner peripheral surface 80b of the cover 72 in the circumferential direction, the projection amount L2 of the second extended guide surface portion 88 is larger than the projection amount L1 of the first extended guide surface portion 87.

According to the above-described configuration, the cooling air which has reached the first peripheral surface portion 81 of the CVT case 21 by the centrifugal fan blade 44 is guided by the first guide surface portion 82 of the CVT case 21 and is therefore prevented from flowing in the axial direction X1. On this account, the cooling air supplied by the centrifugal fan blade 44 is guided so as to flow along the belt 35. Thus, the CVT mechanism 20 including the belt 35 can be efficiently cooled.

The first guide surface portion 82 is arranged at the second side in the axial direction X1 beyond the radially outer end 42a of the movable sheave 42 located farthest away from the fixed sheave 41. More specifically, the first guide surface portion 82 is arranged at the second side in the axial direction X1 beyond the radially outer end 42a of the movable sheave 42 located closest to the fixed sheave 41. Therefore, the cooling air supplied by the centrifugal fan blade 44 is suitably prevented from moving toward the first side in the axial direction X1, and the cooling air flows along the first peripheral surface portion 81 of the CVT case 21 at an adequate flow rate. Thus, the belt 35 can be effectively cooled.

The first guide surface portion 82 is arranged at the first side in the axial direction X1 beyond the position of the radially outer end 41a of the fixed sheave 41. Therefore, the cooling air supplied by the centrifugal fan blade 44 is suitably caught by the first guide surface portion 82 of the CVT case 21, and the cooling air flows along the first peripheral surface portion 81 of the CVT case 21 at an adequate flow rate. Thus, the belt 35 can be effectively cooled.

Since the first guide surface portion 82 is formed on the inner surface 80 of the cover 72, the first guide surface portion 82 facing the first side in the axial direction X1 can be easily formed.

The contact surface 71c of the case main body 71 and the contact surface 72d of the cover 72 are arranged at the second side in the axial direction X1 beyond the radially outer end 42a of the movable sheave 42 located closest to the fixed sheave 41. Therefore, the first guide surface portion 82 facing the first side in the axial direction X1 can be formed at the cover 72.

The second guide surface portion 84 projecting toward the inner side in the radial direction from the second peripheral surface portion 83 is disposed at the first side of the second peripheral surface portion 83 in the axial direction X1. Therefore, the directivity of the cooling air flowing from the driving pulley 33 toward the driven pulley 34 further improves, and therefore, the cooling efficiency can be improved. More specifically, the second guide surface portion 84 is arranged at the first side in the axial direction X1 beyond the radially outer end 42a of the movable sheave 42 located closest to the fixed sheave 41. Therefore, the movable sheave 42 can be suitably cooled while improving the directivity of the cooling air.

The inner surface 80 of the CVT case 21 includes: the first extended guide surface portion 87 that is continuous with the first guide surface portion 82; and the second extended guide surface portion 88 that is continuous with the second guide surface portion 84. Therefore, the belt 35 and the driven pulley 34 can be effectively cooled.

The projection amount L1 of the first extended guide surface portion 87 and the projection amount L2 of the second extended guide surface portion 88 decrease as the first extended guide surface portion 87 and the second extended guide surface portion 88 extend from the driving pulley 33 toward the driven pulley 34. Therefore, the driven pulley 34 can also be suitably cooled by the cooling air.

As above, the embodiment has been described as an example of the technology disclosed in the present application. However, the technology in the present disclosure is not limited to this and is also applicable to embodiments in which modifications, replacements, additions, omissions and the like are suitably made. Moreover, a new embodiment may be prepared by combining the components described in the above embodiment. For example, some of components or methods in an embodiment may be applied to another embodiment, and some of components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A continuously variable transmission comprising:
   a CVT mechanism including a driving pulley, a driven pulley, an annular belt wound around the driving pulley and the driven pulley, and a centrifugal fan blade disposed at the driving pulley; and
   a CVT case that defines an internal space accommodating the CVT mechanism, wherein
   an inner surface of the CVT case includes:
      a peripheral surface portion that covers the CVT mechanism from an outer side in a radial direction orthogonal to an axial direction of the driving pulley; and
      a guide surface portion that projects toward an inner side in the radial direction from the peripheral surface portion,
   the driving pulley includes:
      a fixed sheave at which the centrifugal fan blade is disposed; and
      a movable sheave opposed to the fixed sheave from a first side in the axial direction, and
   the guide surface portion is arranged at a second side in the axial direction beyond a radially outer end of the movable sheave when the movable sheave is located closest to the fixed sheave.

2. The continuously variable transmission according to claim 1, wherein the guide surface portion is arranged at the first side in the axial direction beyond a position of a radially outer end of the fixed sheave.

3. The continuously variable transmission according to claim 1, wherein:
   the CVT case includes:
      a case main body including an opening that is open toward the first side in the axial direction; and
      a cover attached to the case main body from the first side in the axial direction to close the opening, and
   an inner surface of the cover includes the guide surface portion.

4. The continuously variable transmission according to claim 3, wherein
   the case main body and the cover include respective contact surfaces that are in contact with each other, and
   the contact surfaces are arranged at the second side in the axial direction beyond the radially outer end of the movable sheave when the moveable sheave is located closest to the fixed sheave.

5. The continuously variable transmission according to claim 1, wherein
   the peripheral surface portion is a first peripheral surface portion,
   the guide surface portion is a first guide surface portion, and
   the inner surface of the CVT case further includes:
      a second peripheral surface portion that extends from a radially inner end of the first guide surface portion toward the first side in the axial direction and covers the CVT mechanism from the outer side in the radial direction; and
      a second guide surface portion that is located at the first side of the second peripheral surface portion in the axial direction and projects toward the inner side in the radial direction from the second peripheral surface portion.

6. The continuously variable transmission according to claim 5, wherein
   the first guide surface portion is arranged at the second side in the axial direction beyond the radially outer end of the movable sheave when the moveable sheave is located closest to the fixed sheave, and
   the second guide surface portion is arranged at the first side in the axial direction beyond the radially outer end of the movable sheave when the moveable sheave is located closest to the fixed sheave.

7. The continuously variable transmission according to claim 1, wherein the inner surface of the CVT case further includes an extended guide surface portion which, when viewed from the axial direction, projects from the peripheral surface portion toward a virtual line connecting an axis of the driving pulley and an axis of the driven pulley and is continuous with the guide surface portion.

8. The continuously variable transmission according to claim 7, wherein a projection amount of the extended guide surface portion decreases as the extended guide surface portion extends from the driving pulley toward the driven pulley.

9. A utility vehicle comprising:
   a prime mover; and
   a continuously variable transmission connected to the prime mover, wherein
   the continuously variable transmission includes:
      a CVT mechanism including a driving pulley, a driven pulley, an annular belt wound around the driving pulley and the driven pulley, and a centrifugal fan blade disposed at the driving pulley; and
      a CVT case that defines an internal space accommodating the CVT mechanism,
   an inner surface of the CVT case includes:
      a peripheral surface portion that covers the CVT mechanism from an outer side in a radial direction orthogonal to an axial direction of the driving pulley; and
      a guide surface portion that projects toward an inner side in the radial direction from the peripheral surface portion,
   the driving pulley includes:
      a fixed sheave at which the centrifugal fan blade is disposed; and
      a movable sheave opposed to the fixed sheave from a first side in the axial direction, and
   the guide surface portion is arranged at a second side in the axial direction beyond a radially outer end of the movable sheave when the movable sheave is located closest to the fixed sheave.

10. A CVT case that defines an internal space accommodating a CVT mechanism including a driving pulley, a driven pulley, an annular belt wound around the driving pulley and the driven pulley, and a centrifugal fan blade disposed at the driving pulley,
   the CVT case comprising an inner surface that defines the internal space, wherein the inner surface includes:
      a bottom surface portion that is opposed to the driving pulley in an axial direction;
      a first peripheral surface portion that covers the CVT mechanism from an outer side in a radial direction orthogonal to the axial direction of the driving pulley;
      a first guide surface portion that projects toward an inner side in the radial direction from the first peripheral surface portion;
      a second peripheral surface portion that extends from a radially inner end of the first guide surface portion toward a first side in the axial direction and covers the CVT mechanism from the outer side in the radial direction; and a second guide surface portion that is located at the first side of the second peripheral surface portion in the axial direction and projects toward the inner side in the radial direction from the second peripheral surface portion.

11. The continuously variable transmission according to claim 6, wherein the driving pulley further includes a sheave thruster mechanically moving the movable sheave relative to the fixed sheave in the axial direction in accordance with a rotational frequency of the driving pulley, and the second guide surface portion is arranged at the second side in the axial direction beyond the sheave thruster when the movable sheave is located farthest away from the fixed sheave.

\* \* \* \* \*